UNITED STATES PATENT OFFICE.

JOHANN GOTTLIEB BEHRENS, OF BREMEN, GERMANY.

PROCESS OF MANUFACTURING ALKALINE BICARBONATES.

No. 835,771.     Specification of Letters Patent.     Patented Nov. 13, 1906.

Application filed May 19, 1906. Serial No. 317,801.

*To all whom it may concern:*

Be it known that I, JOHANN GOTTLIEB BEHRENS, a subject of the German Emperor, and a resident of Bremen, Germany, have invented an Improved Process of Manufacturing Alkaline Bicarbonates, of which the following is a specification.

This invention relates to a process of manufacturing bicarbonate of soda and bicarbonate of potash by treating anhydrous monocarbonates with a gaseous mixture containing carbon dioxid (carbonic anhydrid) and steam in equimolecular quantities, this treatment being effected at a high pressure corresponding to the temperature at which the bicarbonate to be obtained is decomposed.

Alkaline bicarbonates are usually obtained by dissolving the monocarbonate in water and passing a current of carbon dioxid into the solution. There is also another method of manufacturing bicarbonate of soda which consists in passing carbon dioxid over ordinary crystallized sodium carbonate. According to this method a part of the water of crystallization is separated and in flowing away carries with it the impurities contained in the crude carbonate of soda employed. The result is represented thus:

$$Na_2CO_3 10H_2O + CO_2 = 2NaHCO_3 + 9H_2O.$$

In the former process a solution of the bicarbonate is produced, while in the latter the bicarbonate is obtained in a dry state.

It is specially with a view of obtaining liquid carbon dioxid that the process of manufacturing the bicarbonate in a liquid form is resorted to, as such a solution sets free at boiling temperature one-half of its content of carbon dioxid, which is obtained in this manner in a state of purity, while monocarbonate remains in solution, according to the following equation:

$$2NaHCO_3 = Na_2CO_3 + H_2O + CO_2.$$

Now as the solutions employed in carrying out this process contain usually only fifteen per cent. of bicarbonate it is evident that the cost of manufacture would be greatly reduced by effecting the dissociation of the bicarbonate by heating the bicarbonate in the form of a dry powder instead of boiling the solution containing only fifteen per cent. of bicarbonate. By thus effecting the dissociation of the dry bicarbonate-powder dry monocarbonate is naturally obtained as residue, which must be again converted into bicarbonate by being caused to absorb carbon dioxid and water, according to the equation:

$$Na_2CO_3 + H_2O + CO_2 = 2NaHCO_3.$$

The practical realization of this last reaction presents great difficulties in view of the fact that success depends substantially on the manner in which the water is caused to enter into the reaction. In fact, when the dry monocarbonate-of-soda powder is sprinkled with water it loses its porosity and becomes dense, so that the saturation with the carbon dioxid can only be imperfectly effected. This is the reason why this method of proceeding has not been employed in manufacture. The problem is thus to find a method by which dry bicarbonate can be manufactured from anhydrous monocarbonate. Attempts have been made to solve this problem by mixing with the necessary quantity of steam the combustion-gases from coke, which contain carbon dioxid for the purpose of effecting a uniform distribution of the water and in conducting the gases thus saturated to the monocarbonate to be converted.

However, in the specification of the patent taken out for that process it is stated that in order to avoid the condensation of the steam it is necessary that the mixture of gas and steam should be kept at a temperature of 70° centigrade. Now the inventor of the process forming the subject of the present application and hereinafter described has proved by special experiments that the dry monocarbonate of soda is not able at a temperature of 70° centigrade and at atmospheric pressure to absorb carbon dioxid and water contained in the above-mentioned mixture of combustion-gases and steam, because that temperature is too near the decomposition temperature of the bicarbonate for a reaction to be possible. In following up these experiments I have, however, proved that it is nevertheless possible to bring about the reaction by causing the mixture of gas and steam to act on the monocarbonate after compressing the mixture. It is on this discovery that the present invention is based. The degree of compression to which it is necessary to resort corresponds naturally to the decomposition temperature of the bicarbonate, as the pressure of the mixture of carbon dioxid and steam diluted by nitrogen must overcome the tension of decomposition of the bicarbonate at that temperature. The success of the reaction is not dependent only on the pressure, which plays an important part, but also on the presence of the nitrogen contained in the mixture of gaseous products of combustion. In fact, if it were desired to compress a mixture of pure carbon dioxid and steam it is to be feared that in consequence of the increase of pressure the steam would be condensed prematurely. For this reason the presence of an indifferent gas—in the present instance nitrogen—is of great importance, as the water must be kept under all circumstances in the state of vapor in the compressed mixture.

The discovery described above may be employed commercially in the manufacture of liquid carbon dioxid by proceeding in the following manner: In long tubes of small diameter arranged horizontally such a quantity of monocarbonate in the form of powder is so placed as to fill the tube to the extent of about one half of its diameter. The other half of the diameter is left free, so as to permit of the passage of the mixture of gaseous products of combustion containing carbon dioxid and the equimolecular quantity of steam. In these tubes the reactions take place. Thus while in the processes hitherto known the absorption of the carbon dioxid is effected in principle under normal atmospheric pressure and at a low temperature and the separation of the carbon dioxid at a high temperature, but under the same pressure, exactly the reverse takes place in the present process, in which the pressure varies, while the temperature remains the same—that is to say, the anhydrous carbonate in the form of powder contained in the tubes heated from the outside is constantly maintained at the decomposition temperature of the bicarbonate, and as soon as the mixture of gas and steam containing the carbon dioxid comes in contact with the monocarbonate after having been sufficiently compressed according to the principles set out above bicarbonate of soda will be obtained notwithstanding the increased temperature. If, however, the pressure be lowered, the bicarbonate is quickly decomposed, setting free carbon dioxid and water. The latter is eliminated by condensation and drying, and the pure carbon dioxid remaining is liquefied by compression. The absorption of the carbon dioxid is thus obtained by the raising of and the setting free by the lowering of the pressure. This modification of the pressure at the same temperature has the advantage over the modification of the temperature at the same pressure (atmospheric) of being more convenient, as the dry powder is not heated or cooled easily; but, on the other hand, the pressure can be easily varied. The process just described enables seventy-five per cent. of their content of carbon dioxid to be taken from the combustion-gases.

A process for the manufacture of bicarbonate of soda which at first sight appears to have some analogy to the present process has been suggested, in which the absorption is accelerated by effecting the treatment of the carbonate of soda by carbon dioxid under pressure in a strong iron chamber. In this process the pressure has only an accelerating effect, for the idea is to work without raising the temperature. The reaction takes place without the aid of pressure, although more slowly. If, on the other hand, it be desired to effect the absorption of the carbon dioxid at a high temperature, corresponding to the decomposition temperature of the bicarbonate, it is impossible to work at the normal pressure, and it becomes necessary under all circumstances to work at a higher pressure in order to overcome the tension of the decomposition. Thus in the present process the pressure does not, as in the previous process, simply accelerate the absorption, but constitutes, on the contrary, an essential indispensable factor, without which the reaction cannot take place. Herein lies the fundamental difference between the two processes.

In carrying out the process commercially it is necessary that carbon dioxid and water should be conducted in molecular proportions over the dry monocarbonate according to the following equation:

$$Na_2CO + H_2O + CO_2 = 2NaHCO_3.$$

Under any circumstances an excess of steam must be avoided, as otherwise the anhydrous carbonate powder would absorb this excess of water and convert it into a hard and impenetrable crystalline mass. It is obvious that this would entirely stop the reaction. The permanent porosity of the absorption mass, alike in the state of monocarbonate as in the form of bicarbonate, is thus an essential factor for the success of the process and of the reaction, and for this reason it is necessary that the required volume of steam is introduced into the mixture of combustion-gases containing carbon dioxid. The surest and simplest means of attaining the above-mentioned result is to use the exhaust-gases from an internal-combustion motor employing as a fuel generator-gas—that is to say, gas produced by reacting upon ignited carbon with steam according to the following reaction:

$$C + H_2O = CO + H_2.$$

These gases when mixed with air and ignited in the motor-cylinder combine according to the following equations:

$$CO + H_2 + O_2 = CO_2 + H_2O,$$

the exhaust-gases containing carbon dioxid and steam in exact molecular proportions, and can consequently be conducted directly to the dry monocarbonate. On the other hand, the exhaust-gases being strongly diluted with nitrogen there is no danger, even in case of the gaseous mixture being powerfully compressed, that any premature condensation of steam will occur. From what has been stated it will be seen that the special composition of the exhaust-gases from a generator gas-motor furnishes the basis for the better carrying out of the present invention.

In the actual practice of my process it is not essential that the monocarbonate be acted upon by the gaseous mixture mentioned at any particular temperature or pressure, but only that the temperature be sufficiently high to permit of the occurrence of the reaction and the pressure correspondingly high to prevent the decomposition of the bicarbonate at such temperature. Particularly satisfactory results may be obtained by reacting upon the monocarbonate with the exhaust-gases from an internal-combustion motor employing generator-gas as a fuel at a temperature of 250° centigrade under a pressure equal to three times normal atmospheric pressure.

The idea of utilizing the exhaust-gases from a gas-motor for the manufacture of bicarbonates is not new; but this idea has only been applied in one form, which consists in causing the gas to enter an aqueous solution of monocarbonate in order by absorption to separate the carbon dioxid contained in the gaseous mixture. Thus nitrogen plays no part in the reaction, and the quantity of steam in the gases is inappreciable, as the gases are conveyed into an aqueous lye. The part played by the exhaust-gases in the two methods of application is thus quite different. In the process already known the gases act simply as a source of carbon dioxid, while in the process which forms the subject of the present invention each of the constituent parts of the exhaust-gases plays a special part, the steam and the carbon dioxid entering into the chemical reaction and the nitrogen preventing any premature condensation of the steam.

Having fully described my invention, what I claim, and desire to secure by Letters Patent, is—

The herein-described process of producing alkaline bicarbonates which consists in reacting upon dry alkaline monocarbonate with a gaseous mixture containing an inactive gas, carbon dioxid and steam, the two latter being present in equimolecular proportions, at a high temperature and under a high atmospheric pressure, such pressure being sufficient to prevent decomposition of the bicarbonate at the temperature at which the reaction occurs, the proportion of the inactive gas in the gaseous mixture being sufficient to prevent the condensation of the steam under the influence of the pressure under which the said reaction occurs, substantially as described.

In testimony whereof I have hereunto set my hand in presence of two witnesses.

JOHANN GOTTLIEB BEHRENS.

Witnesses:
FERDINAND REICH,
FREDERICK HOYERMANN.